United States Patent [19]

Balet et al.

[11] Patent Number: 4,873,571
[45] Date of Patent: Oct. 10, 1989

[54] DEVICE FOR POSITIONING A MOCK-UP IN THREE DIMENSIONS, IN PARTICULAR FOR STUDYING BACKSCATTERING FROM SAID MOCK-UP

[75] Inventors: Daniel Balet, Maisons-Lafitte; Renzo Chiomento, Gargenville; Louis Beaulieu, Guyancourt; Yves Poncel, Marly-le-Roi, all of France

[73] Assignee: Electronique Serge Dassault, Saint Cloud, France

[21] Appl. No.: 218,619

[22] Filed: Jul. 13, 1988

[30] Foreign Application Priority Data

Jul. 31, 1987 [FR] France .................. 87 10921

[51] Int. Cl.⁴ .................................... H04N 7/18
[52] U.S. Cl. .................... 358/93; 358/229; 358/903; 901/47
[58] Field of Search .......... 358/93, 229, 903, 108; 901/47

[56] References Cited

U.S. PATENT DOCUMENTS

| | | | |
|---|---|---|---|
| 4,621,265 | 11/1986 | Buse et al. | 342/169 |
| 4,625,938 | 12/1986 | Brown | 358/229 |
| 4,668,981 | 5/1987 | Egger | 358/108 |
| 4,710,819 | 12/1987 | Brown | 358/229 |

FOREIGN PATENT DOCUMENTS 2929814 1/1981 Fed. Rep. of Germany .

OTHER PUBLICATIONS

IEEE Transactions on Geoscience and Remote Sensing, vol. GE-22, No. 2, Mars 1984, pp. 165–169, IEEE, New York, U.S.; D. R. Brunfeldt et al.: "Active reflector for radar calibration".

Primary Examiner—Howard W. Britton
Attorney, Agent, or Firm—Christie, Parker & Hale

[57] ABSTRACT

The present invention relates to a device (1) for positioning a mock-up (2). The device comprises supports (3, 4) suitable for holding the mock-up in a variable position which is controllable in attitude and/or altitude relative to an illumination axis (I–I'). The mock-up is held by two pairs of top wires (6) and by two pairs of bottom wires (7). These four pairs of wires are mounted at their opposite ends on tensioning means (8) fixed to the opposite ends of the supports (3, 4) and intended to adjust the tensions and the lengths of the wires as a function of a desired attitude and/or a desired altitude for the mock-up. The device also includes control means (9) for controlling the angular positions of the supports (3, 4), and cameras connected to processor means for measuring the real position and attitude of the mock-up.

16 Claims, 6 Drawing Sheets

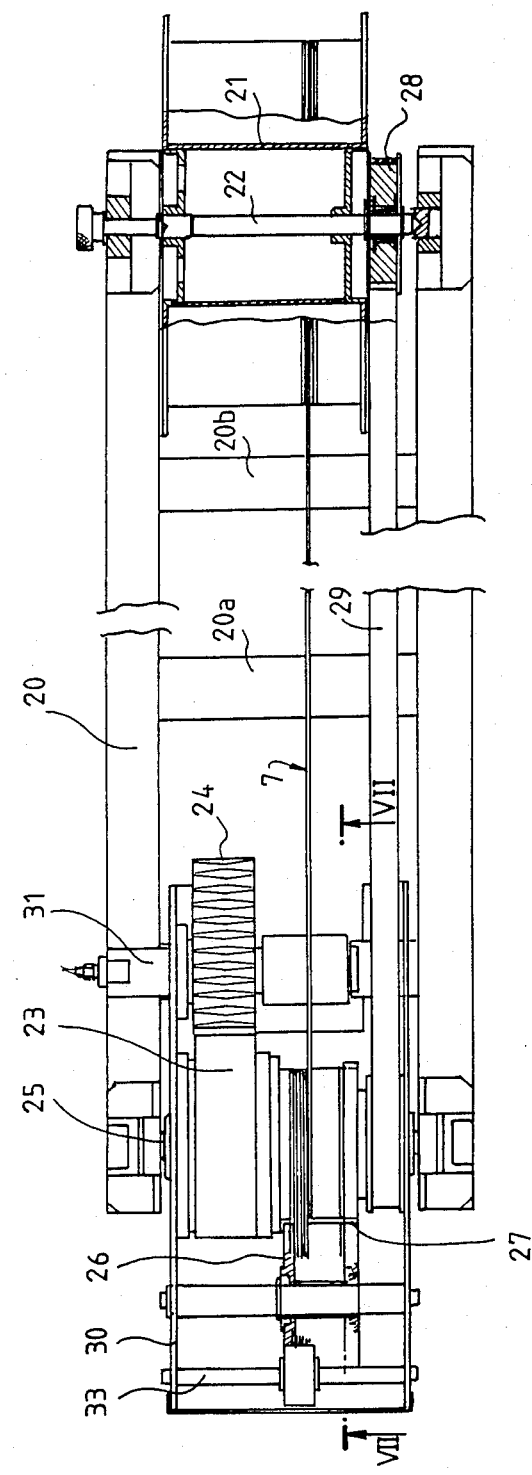

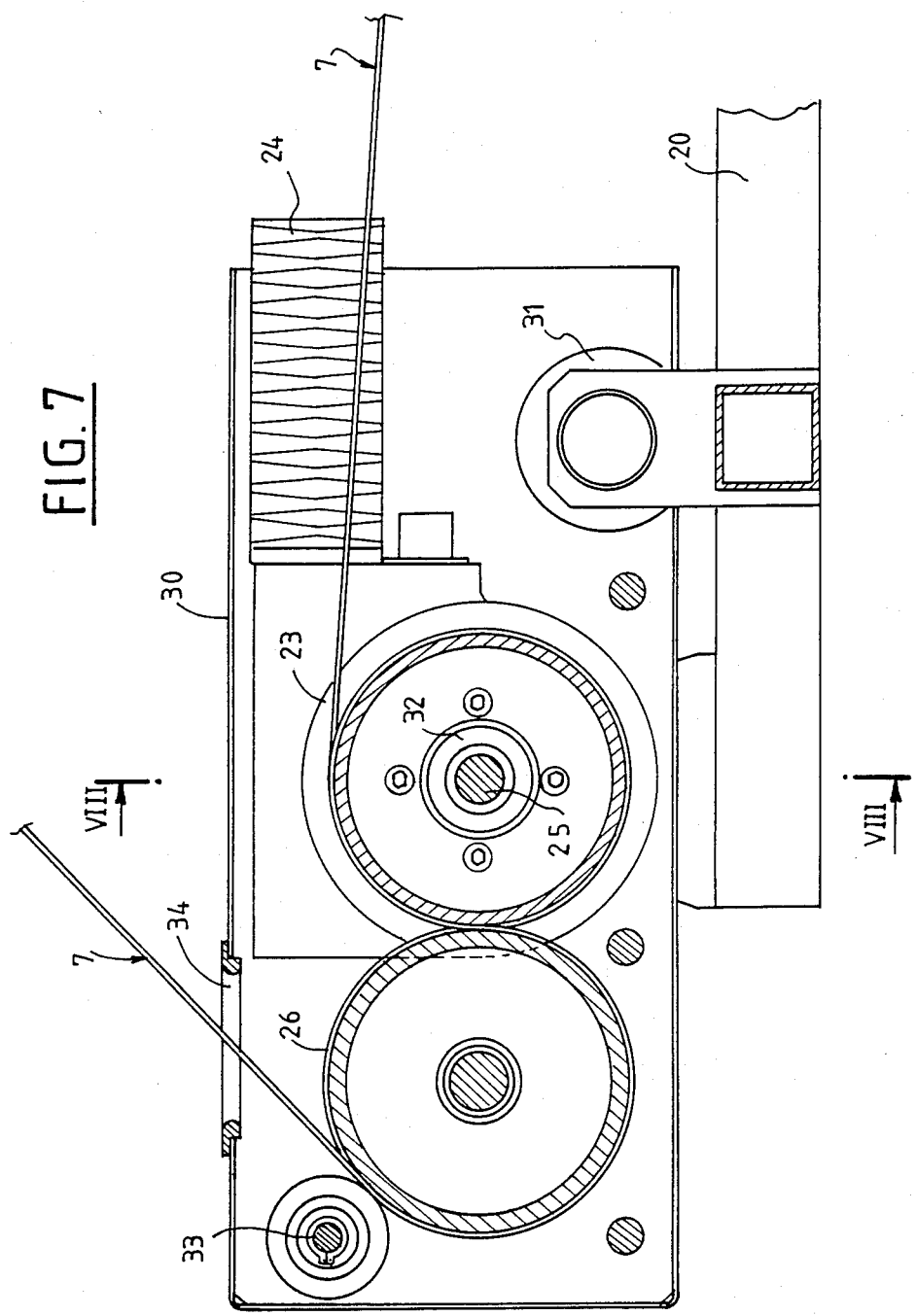

DEVICE FOR POSITIONING A MOCK-UP IN THREE DIMENSIONS, IN PARTICULAR FOR STUDYING BACKSCATTERING FROM SAID MOCK-UP

The invention relates to a device for positioning a mock-up in three dimensions, in particular for studying back-scattering from said mock-up, in particular at microwave frequencies.

BACKGROUND OF THE INVENTION

Such investigations may be performed in the open air or in an anechoic chamber (anechoic for microwaves). The invention is particularly suitable for the second case.

The fixed microwave emitter/receiver which is pointed towards the mock-up must be capable of accurately measuring its backscattering characteristics. In theory, the position at which the mock-up is located is fixed, however it is necessary to provide for varying the height of the mock-up relative to the microwave illumination axis. Further, depending on its scale, the mass of the mock-up may be as much as several hundred kilograms.

One difficulty then lies in the need for the support (or positioner) itself to backscatter microwaves very little, in other words, its radar echo area or cross-section must be small.

It is also necessary for the attitude and the position in three dimensions of the mock-up to be accurately known for each of the microwave measurements. In the present specification, a "microwave measurement" is constituted by a full set of information that can be acquired by the emitter/receiver. Its duration is related, for example, to the form factor which is the product of pulse duration multiplied by recurrence frequency when considering a Doppler pulse radar. Similarly, "attitude" is taken in its widest sense (roll, pitch, relative bearing).

Up to now, mock-up supports such as a pole or a block of foam have been used in association with suitable positioning means.

Further, the position and the attitude of the mock-up have previously been determined by mechanically or optically tracking the attitude of the supports.

It is now becoming desirable to work with mock-ups that backscatter little or very little, and as a result these known devices are becoming unsuitable.

The object of the present invention is to provide mock-up positioning means which, themselves, have a very small radar echo area (REA).

Another object of the invention is for said REA to remain very small regardless of the attitude of the mock-up, which attitude may be modified continuously, particularly in relative bearing.

Another object of the invention is to make it possible to accurately measure the attitude of the mock-up, in particular relative bearing rotation, without requiring marker devices to be applied thereon, since such market devices could alter the backscattering from a very low REA mock-up, and without requiring devices for tracking the attitude of the supports.

Another object of the invention is to ensure that the attitude of the mock-up remains stable while microwave measurements, as defined above, are being performed.

SUMMARY OF THE INVENTION

The present invention thus provides a device for positioning a mock-up for performing backscattering measurements, in particular at microwave frequencies, the device holding the mock-up in a controlled position which is variable, at least in attitude, relative to an illumination axis which is theoretically horizontal, An exemplary positioning device constructed in accordance with the invention includes:

(a) a top support and a bottom support which each include end portions which may be repositioned in two respective spaced apart fixed planes and which may be rotated about a substantially vertical axis passing substantially through the middle of each of these supports;

(b) two pairs of top wires each having one end fixed to the mock-up in the top portion of the mock-up;

(c) two pairs of bottom wires each having one end fixed to the mock-up in the bottom of the mock-up;

said two pairs of top wires having their upper ends extending to respective tensioning means located at respective end portions of the top support and intended to adjust the tensions and the lengths of the wires as a function of a desired attitude and/or a desired altitude for the mock-up;

said two pairs of bottom wires extending to respective tensioning means fixed located at respective end portions of the bottom support and intended to adjust the tensions and the lengths of the wires as a function of a desired attitude and/or a desired altitude for the mock-up;

(d) control means for controlling the angular position of said two supports and of the relative position of their respective end portions as a function of a desired altitude and/or a desired attitude for the mock-up.

Advantageously, the control means and the tensioning means are disposed in such a manner that the angle between each of the wires and the illumination direction remains less than a threshold selected to be less than 90°, and preferably about 60°.

Advantageously, the angle of each of the wires with the vertical is about 45°.

The connection zones where the wires enter the mock-up are situated in substantially the same vertical plane passing through the center of gravity of the mock-up.

In a preferred embodiment, connection zones include fine bores, and the ends of the top wires (or the bottom wires as the case may be) connected to the mock-up penetrate into the top portion (or the bottom portion as the case may be) of the mock-up via said bores and are permanently fixed inside the mock-up.

The wires are made of a substance having high stiffness, in particular of an aromatic polyamide fiber such as Kevlar (registered trademark).

Preferably, the top support is constituted by two pairs of top arms situated on either side of the control means, and the bottom support is constituted by two pairs of bottom arms situated on either side of the control means.

The tensioning means for tensioning a wire are constituted firstly by supply means containing a supply of said wire, and secondly by a control system for controlling said supply means and serving firstly to adjust the length of the wire as a function of the desired position of the mock-up and secondly to ensure that the wire is always under tension.

The supply means and the control system are mounted on a frame removably fixed to the end of each top and bottom support, and the supply means are constituted by a wheel fixed to a shaft connected to the frame, with the wheel having the wire wound thereon and being situated in a zone close to the end of the frame which is nearest to the vertical axis of rotation of the corresponding support.

Preferably, the control system is constituted firstly by a first grooved pulley rotated by a stepper motor about a pivot shaft connected to the frame and mounted in a housing capable of pivoting about said pivot shaft, secondly by a second grooved pulley, connected to the housing on that side of the pivot shaft which is furthest from the wheel, and rotated by the first grooved pulley in such a manner as to rotate through an equal angle to the first grooved pulley but in the opposite direction, said wire leaving the wheel and being wound over the first and second grooved pulleys in succession so as to form a figure-of-eight configuration prior to leaving the housing via an opening, thirdly by a control pulley controlling the wheel and mounted on the rotation shaft of the wheel so as to communicate a variable speed of rotation thereto, and fourthly by a transmission belt connecting the first grooved pulley and the control pulley and communicating a given speed of rotation to the control pulley.

In a preferred embodiment, the control pulley is a friction pulley, and the housing is preferably provided with a force sensor, which senses in particular by measuring shear, which is likewise connected to the frame, and which serves to measure the tension in the wire, and the housing may be provided with a damping device, in particular rubber sleeves situated on the pivot shaft.

The control system further includes a presser wheel situated inside the housing in the vicinity of the second grooved pulley so as to come into contact with that portion of the wire which leaves the second grooved pulley on its way to the mock-up.

Advantageously, two cameras are also provided fixed to one of the supports and pointing towards the mock-up together with processor means connected to said cameras for measuring the error of the relative angle of the mock-up compared with its nominal position and also its displacement offset compared with its nominal position.

The device of the invention may also include at least one further camera, which is fixed and which points towards the mock-up in an equatorial plane, thereby enabling the processor means to measure at least the pitch angle of the mock-up.

Advantageously, the processor means perform interpolation on the position and the attitude of the mock-up.

BRIEF DESCRIPTION OF THE DRAWINGS

An embodiment of the invention is described by way of example with reference to the accompanying drawings, in which:

FIG. 6 is a partially cut-away plan view of the FIG. 5 tensioning means;

FIG. 7 is a section on line VII—VII of FIG. 6; and

The accompanying drawings include information which is definitive in nature. Consequently, they may serve not only to facilitate understanding the following detailed description, but also to contribute to defining the invention, where appropriate.

MORE DETAILED DESCRIPTION

Figure 1:
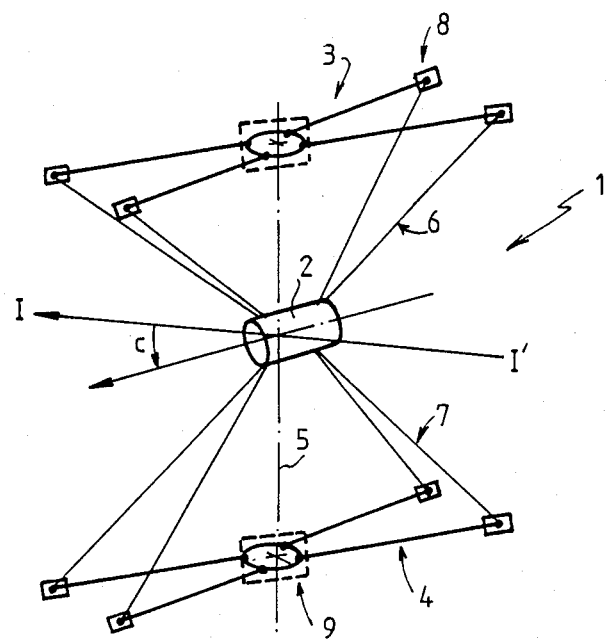
FIG. 1 is a diagrammatic view of one embodiment of a positioning device in accordance with the invention, having a geometry corresponding to a measurement position of the mock-up such that the angle C described by the longitudinal axis of the mock-up from the illumination axis lies between about $-45°$ and about $+45°$, or between about 135° and about 225°.
Figure 2:
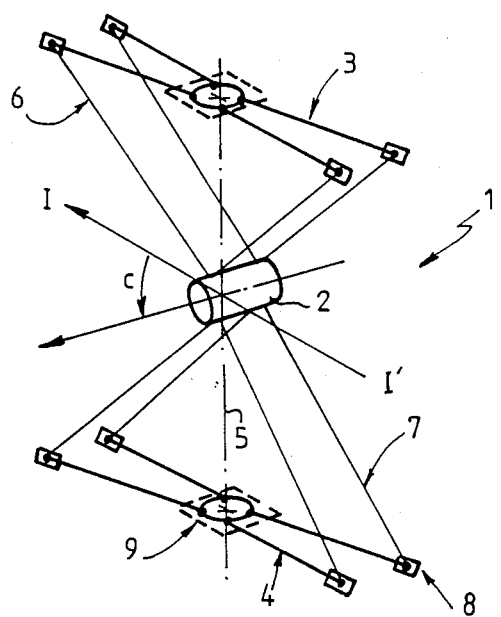
FIG. 2 is a diagrammatic view of a positioning device whose geometry corresponds to a mock-up measurement position such that the angle C described by the longitudinal axis of the mock-up relative to the illumination axis lies between about 45° and about 135°, or between about 225° and about 315°.
Figure 3:
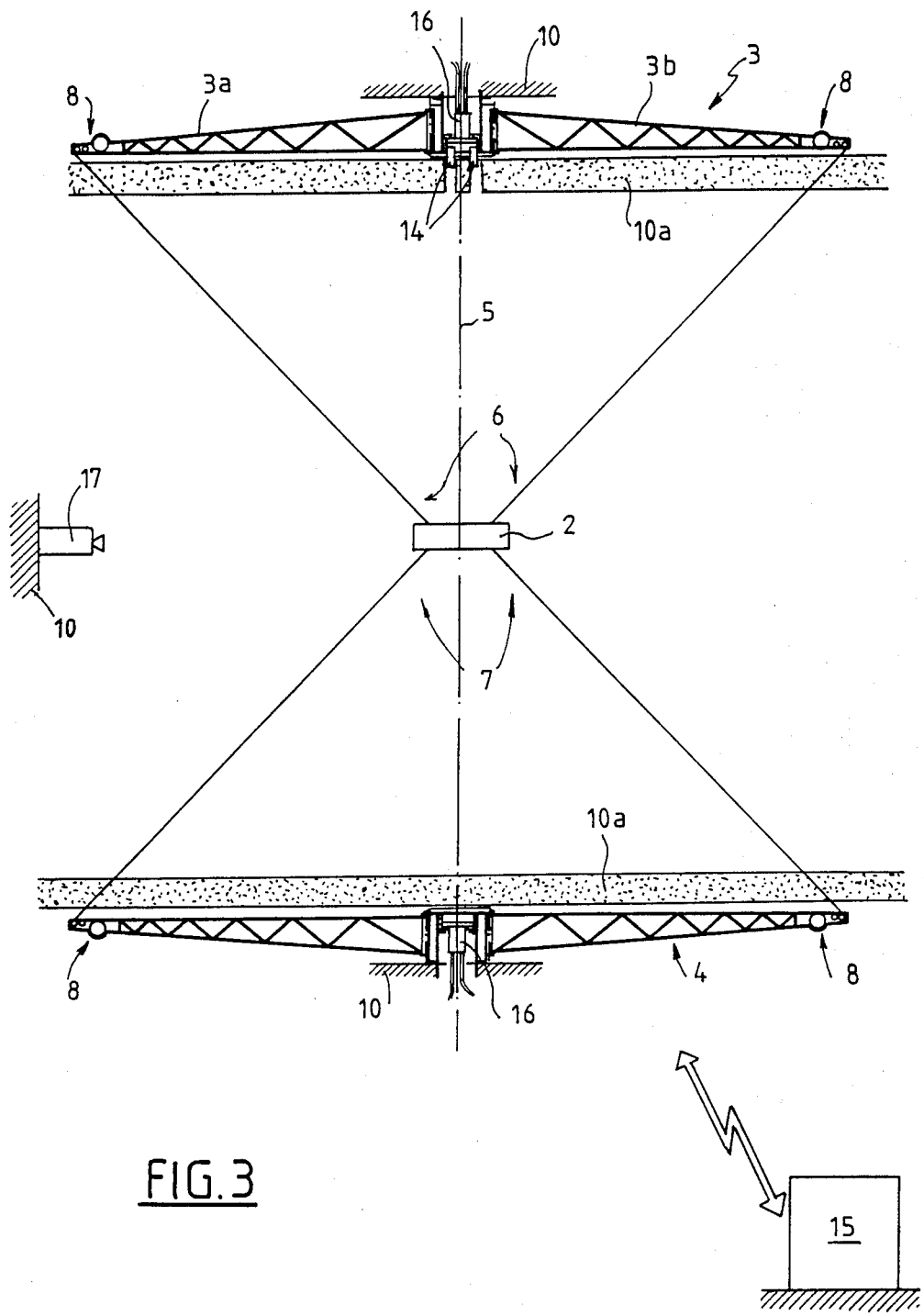
FIG. 3 is a longitudinal section through the positioning device in accordance with the invention with the geometry of the device corresponding to an angle C equal to 0°.
Figure 4:
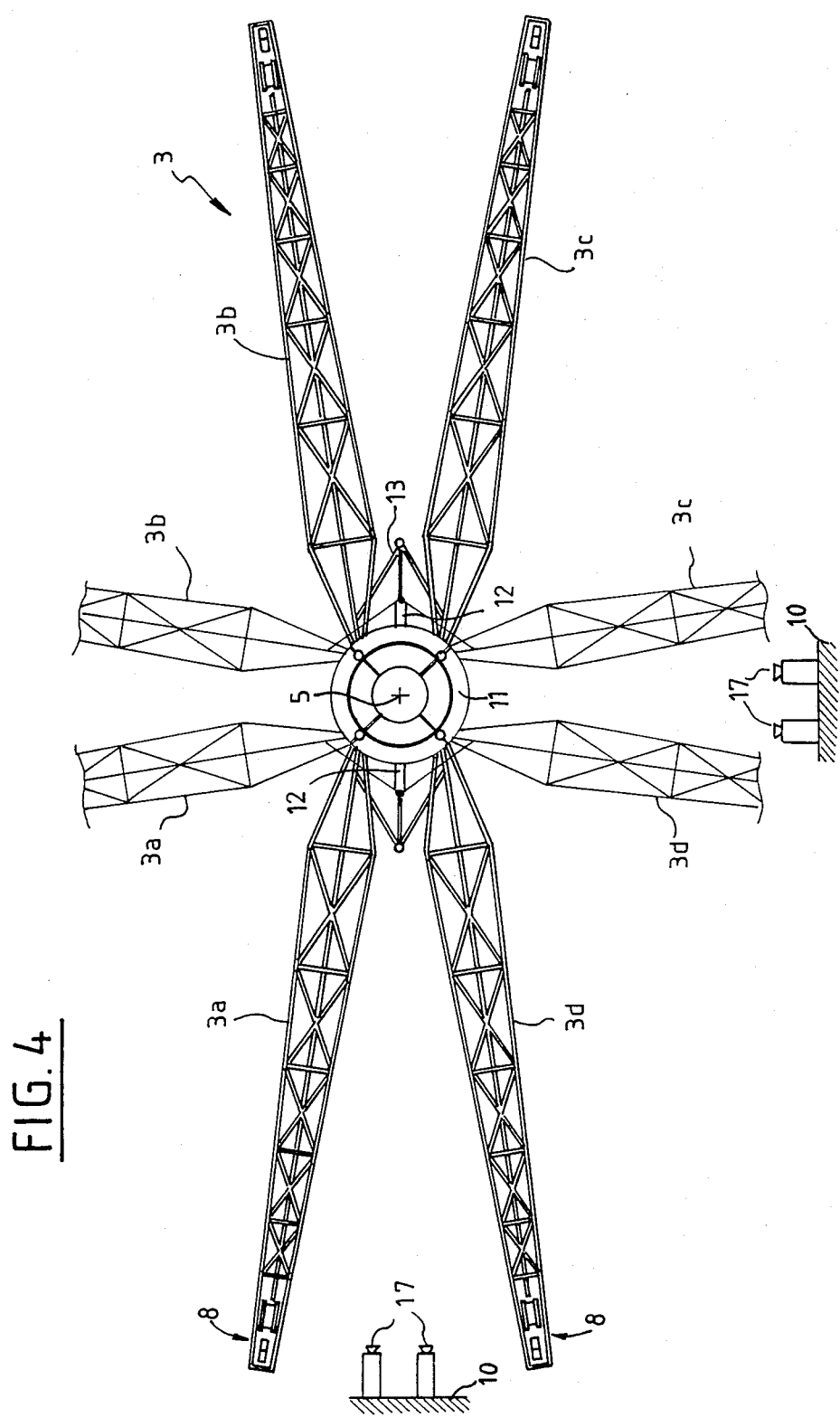
FIG. 4 is a plan view of a portion of the positioning device shown in FIG. 3, with heavy lines showing the top support corresponding to the geometery of FIG. 1 and with fine lines showing the top support corresponding to the geometry of FIG. 2.
Figure 5:
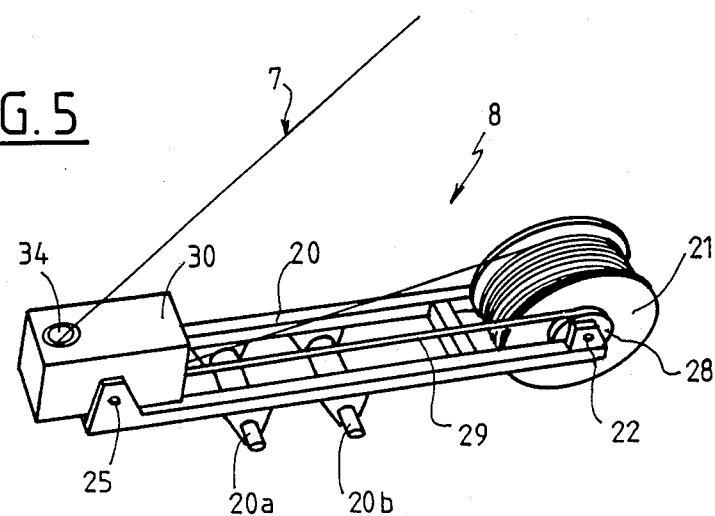
FIG. 5 is a perspective view of means for tensioning the mock-up supporting wires.
Figure 8:
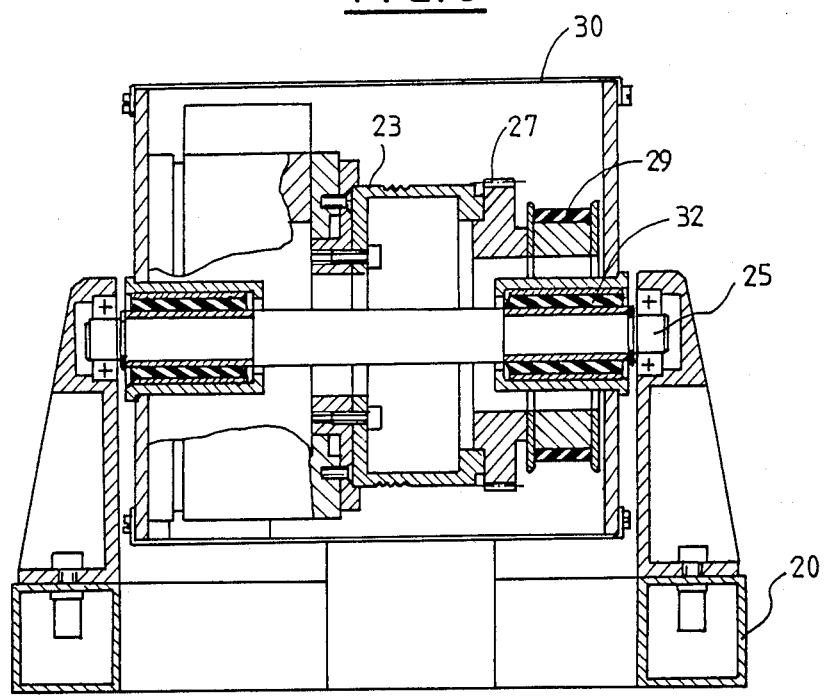
FIG. 8 is a section on line VIII—VIII of FIG. 7.

With reference to FIGS. 1 and 2, it can be seen that the reference 1 is an overall reference designating a device for positioning a mock-up 2. The mock-up is positioned for the purpose of performing backscattering measurement, in particular at microwave frequencies. Once the mock-up 2 has been positioned, its longitudinal axis describes an angle C relative to the theoretically horizontal axis I-I' of radio illumination.

The positioning device 1 comprises support means suitable for holding the mock-up 2 in the desired measurement position relative to the illumination axis I-I'. These support means comprise a top support 3 and a bottom support 4 which are independently movable, in two respective spaced apart fixed planes, in controlled rotation, about a common vertical axis 5 passing substantially through the middle of each of the supports 3 and 4. The support means also include two pairs of top wires 6 (or bottom wires 7) each having an end which penetrates via a small bore into the top portion (or the bottom portion) of the mock-up 2, and each permanently fixed to the inside thereof by means of a knot. This is the preferred mode of fixing, but any other fixing mode may be envisaged, for example gluing to top and bottom connection zones of the mock-up. The two pairs of top wires 6 and bottom wires 7 are mounted at their opposite ends on respective tensioning means 8 which are fixed to opposite ends of the top support 3 and of the bottom support 4. The support means finally include control means 9 for controlling the angular position of the top and bottom supports 3 and 4 as a function of a desired position (in altitude and/or attitude) for the mock-up 2.

Depending on the value of the angle C, the positioning device adopts a geometry of the type shown in FIG. 1 (i.e. the longitudinal axis of the supports is at a small angle relative to the longitudinal axis of the mock-up), or else a geometry of the type shown in FIG. 2 (i.e. the longitudinal axis of the support is offset by 90° relative to the FIG. 1 condition), for the purpose of avoiding unwanted backscattering from the wires 6 and 7. The Applicant has shown, during experiments, that the angle & between the illumination axis I-I' and each of the wires 6 and 7 must remain less than a selected threshold which is less than 90°, with the selected threshold for obtaining best accuracy in REA measurements being about 60°. However, the angle & is a function of the angle C. Consequently the geometry of the device is itself a function of said angle C.

On referring to FIGS. 3 to 8, it can be seen that the positioning device 1 is shown in greater detail. The device 1 is placed in an anachoic chamber 10 whose walls are covered with absorbing elements. The device could also have been placed in an echoic chamber. The top support 3 is fixed to the ceiling of said chamber and the bottom support 4 is fixed to the floor thereof. These supports are themselves covered on their faces facing the model 2 with a layer of absorbing elements 10a.

The top support 3 is constituted by four identical top arms 3a, 3b, 3c, and 3d each of which is mounted to rotate about a vertical axis at the periphery of a circular plate 11 whose axis coincides with the axis of rotation 5 of the device, with the axes of the top arms being equidistant from one another and being disposed symmetrically about a vertical plane passing through the axis of rotation 5. This plate is rotated by a motor (not shown in these figures). The plate 11 also includes at its periphery, in diametrically opposite positions and in the plane of symmetry of the four top arms, two control actuators 12 for controlling the top arms 3a to 3d. The rod of each actuator 12 is connected by two respective connection bars 13 to the two adjacent arms situated on either side of the plane of symmetry. The effect of the actuator on said connection bars 13 is to cause the arms 3a to 3d to change between a geometry of the type shown in FIG. 1 to a geometry of the type shown in FIG. 2.

An identical device is provided for the bottom support 4 which is provided with four identical bottom arms. The two plates 11 and the arm control actuator 12 and the connection bars 13 constitute the control means 9 for controlling the angular position of the two supports 3 and 4 of the positioning device 1. The angle of rotation of the plates may be measured to within better than 1/100° by means of an incremental encoder.

The top and bottom wires 6 and 7 are made of a substance having high stiffness, in particular an aromatic polyamide fiber such as Kevlar (registered trademark). The bores in the mock-up in which the top and bottom wires 6 and 7 are permanently fixed by means of respective knots are situated substantially in a common vertical plane passing through the center of gravity of the mock-up 2. Any other appropriate fixing means must ensure that the connection zones are situated substantially in a single vertical plane. The wires have a diameter of about 7/10 mm, and the bores have a diameter of about 8/10 mm, which has no significant radar effect so long as the wavelength is 10 to 15 times greater than said value. At shorter wavelengths, the bores will create bright spots on the mock-up, however these are easily identified and can be eliminated by processing.

Such a device is large in size. The height between the bottom support 4 and the top support 3 is about 12 meters (m). Each support is about 10 m long. When the mock-up is in a measuring position at a height of about 6 m, the wires are inclined at about 45° relative to the vertical. The conventional size of a mock-up may be as much as 3 m. Devices which are not so tall, e.g. which are about 8 m tall, could also be designed.

The wires are mounted on identical tensioning means 8 which are fixed to respective ends of the top and bottom arms. These tensioning means are intended to adjust the tension and the length of each wire as a function of a desired mock-up position (altitude and/or attitude).

In order to monitor the position of the mock-up 2 in three dimensions, the positioning device also includes a display system. This display system comprises two cameras 14 fixed to the plate 11 connected to the top support 3. These cameras 14 are disposed at 180° from each other and point towards two fixed marks on the mock-up, which marks are diametrically opposite each other about the center of gravity of the mock-up. The cameras measure the difference between the relative bearing of the mock-up and its relative bearing when at rest. The objective lenses of the cameras are selected to provide readout at better than ⅓ of a milliradian. The information coming from the cameras 14 and the tensioning means 8 and the incremental encoders of the plates 11 is transmitted to processor means 15 by a lip ring system 16 fixed to the axis of each of the plates 11.

The display system also includes two pairs of cameras 17 situated in the equatorial plane of the chamber 10 and installed on two adjacent walls thereof. These four cameras 17 point towards the mock-up 2 and record possible changes in attitude and altitude of the mock-up compared with its rest position. All of this information is also transmitted to the processor means 15. In order to simplify the drawings, the cameras 17 are shown at distances from the axis 15 which are different from their real distances.

The processor means 15 include a camera processor module which controls the cameras 14 and 17 and which ensures that they are synchronized, a central computer coupled to the processor module, and finally a display monitor for visually verifying that the positioning device is operating properly.

Reference is now made more particularly to FIGS. 5 to 8 which show one of the tensioning means 8 fixed to an end of a support in greater detail, for example they show a tensioning means fixed to an end of a bottom support.

The means 8 for tensioning a wire 7 are constituted firstly by means holding a supply of said wire, and secondly by a control system for said supply means serving firstly to adjust the length of the wire 7 as a function of the desired position of the mock-up 2, and secondly serving to ensure that the wire 7 is always under tension.

The supply means and the control system are mounted on a frame 20 which is removably fixed to the end of the corresponding arm by means of two quick-release pegs 20a and 20b. This method of fixing makes it possible to rapidly replace these tensioning means in the event of a breakdown. The supply means are constituted by a wheel 21 fixed to a shaft 22 connected to the frame 20, and having the wire 7 wound thereon. The wheel is situated close to the end of the frame which is closest to the plate 11 of the corresponding arm, and may contain up to about 1,000 m of wire.

The control system is constituted firstly by a first grooved pulley 23 which is rotated by a stepper motor 24 about a shaft 25 connected to the frame 20. The motor 24 drives the first grooved pulley 23 irreversibly, i.e. the pulley cannot rotate in the reverse direction when the motor is switched off. Further, an incremental encoder gives the angular position to within 1/100 of a degree, and given the dimensions of the tensioning means the paid out length of cable is known to within better than 0.02 mm.

The first grooved pulley 23 is mounted in a housing 30 capable of pivoting about the shaft 25. The control system comprises, secondly, a second grooved pulley 26 connected to the housing 30 on that side of its pivot axis 25 which is furthest from the wheel 21. This second grooved pulley 26 is rotated by the first grooved pulley 23 by a gear system 27 so that it rotates through an equal but opposite angle to the angle through which the first grooved pulley 23 rotates. The wire 7 leaves the wheel 21 and winds successively over the first grooved pulley 23 and then over the second grooved pulley 28 in a multiple figure-of-eight configuration.

Thirdly, the control system comprises a control pulley 28 for controlling the wheel 21. This control pulley 28 is a friction pulley mounted on the shaft of the wheel 21 so as to impart a variable speed of rotation thereto as a function of its resistance to being rotated.

Finally, the control system fourthly comprises a transmission belt 29 connecting the first grooved pulley 23 and the friction pulley 28. The belt 29 imparts a given speed of rotation to the control pulley 28, which speed is a function of the speed of the first grooved pulley 23 and of the respective diameters of the pulleys driven by the belt 29.

The housing 30 includes a force sensor 31 which is also connected to the frame 20. This force sensor performs a shear measurement and serves to measure the tension in the wire 7.

The housing 30 also includes a damping device constituted by two rubber sleeves 32 situated at the two ends of the pivot shaft 25, between the shaft and the housing 30.

The housing 30 further includes a pressure wheel 33 situated close to the second grooved pulley 26. The axis of the pressure wheel 33 is situated slightly above the axes of the two grooved pulleys 23 and 26 so as to bring the wheel into contact with that portion of the wire 7 which leaves the second grooved pulley 26 on its way to the mock-up 2. This wire portion leaves the second grooved pulley 26 and thus the housing 30 via an opening 34 provided through the housing.

The operation of this positioning device and the measurement of the radar echo area (REA) are described below. Initially, the mock-up is raised from the ground to its measuring position, i.e. through about 6 meters. This operation is performed by winding in the top wires 6 using the tensioning means 8 and by paying out the bottom wires 7 from the other tensioning means 8. The tension in the bottom wires and in the top wires always remains positive. The system for controlling the tensioning means is designed so that during a winding-in stage, the speed of rotation of the supply wheel 21 is always slightly greater than the speed of rotation of the first grooved pulley 23 and of the second grooved pulley 26. This is achieved by the belt transmission 29 and by a predetermined friction value applied to the shaft 22 of the wheel 21. Similarly, when paying out, the wires are always under tension since, under these circumstances, the speed of rotation of the wheel 21 is slightly less than the speed of the first and second grooved pulleys, which effect is likewise obtained by the transmission belt 29 and by friction of a different value applied to the shaft 22. The tension in each wire is measured by its force sensor 31 which operates in shear between the corresponding chassis 20 and housing 30.

When the mock-up is in the measuring position, its attitude is varied relative to the illuminating axis I-I' by acting on the tensions of the various wires. During this measurement stage, the top wires and the bottom wires are always under tension, as mentioned above. The positions of the top and bottom supports 3 and 4 depend on the value of the angle C during the measurement. Relative bearing attitude is continuously varied over a possible range of 360°. It is also possible to vary pitch between about ±30°.

It is also possible to vary the attitude of the mock-up 2 by angularly displacing the top support 3 relative to the bottom support 4, however this would require different lengths of wire and this is considerably less advantageous.

It should be observed that when the stepper motor 24 of the tensioning means 8 are stopped, the irreversible nature in rotation of the first grooved pulleys 23 and the low tension in the wires due to the friction of the friction pulleys 28 suffices to hold the mock-up 2 in position.

When the mock-up is in a measurement position, it is subject to rocking movements about several of the degrees of freedom of the mock-up, i.e. it is subject to movements which are small in amplitude compared with possible swinging amplitudes. Although such movements are inherent to this type of mounting, they nevertheless give rise to parasitic additional oscillations which need first to be limited and then to be measured if it is desired to attribute a high degree of accuracy to each electromagnetic measurement performed on the mock-up under test.

Thus, as it moves, all of the differences between the nominal position of the mock-up given by the geometry of the positioning device and its real positions must be measured.

The mock-up is placed in a given measuring position and in this position, measurements are performed each time a pulse train is emitted, i.e. about every 100 milliseconds. The processor means 15 need about 50 milliseconds in order to perform the measurement per se, and about 50 additional milliseconds in order to clear themselves digitally and to preprocess the information and get ready to perform the following measurement.

The composite video signals from the cameras are amplified and digitized on eight bits, for example. The resulting digital signals are then filtered in order to eliminate the D.C. component of the image from further processing, and then compared with a threshold which is recalculated for each image and which depends, in particular, on an average value of the contrast between the mark and the image background as observed previously.

Thresholding generates a binary signal and this can be seen on the display monitor by a white video mark on a black background, or vice versa.

The various processing stages can be displayed by storing the signals; this also makes it possible to hide the effects of switching between cameras.

At this level, the processor card of the central computer performs the desired processing on the basis of binary image data. It can calculate displacement of a point from one image to another or relative to a reference which may be the rest position of the image, and it can deduce the displacement of the vector constituted by the two points aimed at by each of the cameras.

The final information is then sent to the computer at a fixed recurrence rate or on the basis of an external synchronizing signal.

If the REA measurements are performed at a high rate, the position and attitude measurements are spaced further apart. Interpolation is then performed between the various measured positions and attitudes in order to avoid too high a number of measurements.

Naturally, the above-described embodiment is not limiting and any desirable modification may be made thereto without going beyond the scope of the invention.

We claim:

1. A positioning device for supporting a mock-up during backscattering measurements at microwave frequencies, in a position which may be varied, at least in attitude, relative to an illumination axis, said positioning device comprising:

(a) a top support including four top support end portions which are movable between at least two sets of relative positions in a top plane, said top support being rotatable relative to a second axis substantially perpendicular to said illumination axis, said second axis passing substantially through a middle portion of said top support;

(b) a bottom support including four bottom support end portions which are also movable from at least two relative positions but in a bottom plane below said top plane, said bottom support also being rotatable about said second axis, said second axis also passing substantially through a middle portion of said bottom support;

(c) four top wires each having a lower end fixed to a top portion of the mock-up and extending upwardly to a respective one of said top support end portions;

(d) four bottom wires each having an upper end fixed to a bottom portion of the mock-up and extending downwardly to a respective one of said bottom support end portions;

(e) tensioning means operatively coupled to each of the top support end portions and the bottom support end portions for adjusting the respective tensions and effective lengths of said top and bottom wires as a function of a desired attitude and altitude for the mock-up; and (f) control means for controlling the angular positions of said top and bottom supports, the relative positions of said top support end portions and the relative positions of said bottom support end portions, as a function of a desired attitude for the mock-up relative to said illumination axis.

2. A device according to claim 1, wherein the angle of each of the wires with the vertical is about 45°.

3. A device according to claim 1, wherein the wires are made of a substance having high stiffness, in particular of an aromatic polyamide fiber such as Kevlar.

4. A device according to claim 1, wherein the top support is comprises two pairs of top arms situated on either side of the control means, and wherein the bottom support is constituted by two pairs of bottom arms situated on either side of the control means.

5. A device according to claim 1, wherein the control means and the tensioning means are disposed in such a manner that the angle between each of the wires and the illumination direction remains less than a threshold selected to be less than 90°.

6. A device according to claim 5, wherein said threshold is about 60°.

7. A device according to claim 1, wherein connection zones defined by the intersection of the wires with the mock-up are situated in substantially the same vertical plane passing through the center of gravity of the mock-up.

8. A device according to claim 7, wherein the connection zones include fine bores, and wherein the ends of the top wires connected to the mock-up penetrate into the top portion of the mock-up via said bores and are permanently fixed inside the mock-up.

9. A device according to claim 1, wherein two cameras are also provided fixed to one of the supports and pointing towards the mock-up together with processor means connected to said cameras for measuring the error in the relative angle of the mock-up compared with its nominal position and also its offset compared with its nominal position.

10. A device according to claim 9, also including at least one further camera, which is fixed and which points towards the mock-up in an equatorial plane, thereby enabling the processor means to measure at least the pitch angle of the mock-up.

11. A device according to claim 9, wherein the processor means perform interpolation on the position and the attitude of the mock-up.

12. A device according to claim 1, wherein the tensioning means for tensioning a wire comprises supply means containing a supply of said wire, and by a control system for controlling said supply means and serving firstly to adjust the length of the wire as a function of the desired position of the mock-up and secondly to ensure that the wire is always under tension.

13. A device according to claim 12, wherein the housing is provided with a force sensor, which senses in particular by measuring shear, which is likewise connected to the frame and which serves to measure the tension in the wire, and wherein the housing is provided with a damping device, comprising rubber sleeves situated on the pivot shaft.

14. A device according to claim 12, wherein the control system further includes a presser wheel situated inside the housing in the vicinity of the second grooved pulley so as to come into contact with that portion of the wire which leaves the second grooved pulley on its way to the mock-up.

15. A device according to claim 12, wherein:

the supply means and the control system are mounted on a frame removably fixed to the end of each top and bottom support;

the supply means includes a wheel fixed to a shaft connected to the frame, with the wheel having the wire wound thereon and being situated in a zone close to that end of the frame which is nearest to the vertical axis of rotation of the corresponding support; and the control system includes:

firstly by a first grooved pulley rotated by a stepper motor about a pivot shaft connected to the frame and mounted in a housing capable of pivoting about said pivot shaft;

secondly by a second grooved pulley, connected to the housing on that side of the pivot shaft which is furthest from the wheel, and rotated by the first grooved pulley in such a manner as to rotate through an equal angle to the first grooved pulley but in the opposite direction, said wire leaving the wheel and being wound over the first and second grooved pulleys in succession so as to form a figure-of-eight configuration prior to leaving the housing via an opening;

thirdly by a control pulley controlling the wheel and mounted on the rotation shat of the wheel so as to communicate a variable speed of rotation thereto; and fourthly by a transmission belt connecting the first grooved pulley and the control pulley and communicating a given speed of rotation to the control pulley.

16. A device according to claim 15, wherein the control pulley is a friction pulley.

* * * * *

UNITED STATES PATENT AND TRADEMARK OFFICE
CERTIFICATE OF CORRECTION

PATENT NO. : 4,873,571
DATED : October 10, 1989
INVENTOR(S) : D. Balet; R. Chiomento; L. Beaulieu; Y. Poncel It is certified that error appears in the above-identified patent and that said Letters Patent is hereby corrected as shown below:

Column 2, line 8, after "horizontal" change the comma to a period.

Column 4, line 67, change "&" to -- $\delta$ --.

Column 5, line 3, change "&" to -- $\delta$ --.
Column 5, line 8, change "anachoic" to -- anechoic --.

Column 6, line 17, change "lip" to -- slip --.

Column 9, line 55, after "support" delete "is".

Column 11, line 2, change "shat" to -- shaft --.

Signed and Sealed this

Nineteenth Day of November, 1991

Attest:

HARRY F. MANBECK. JR.

Attesting Officer    Commissioner of Patents and Trademarks